United States Patent [19]
Hochstein

[11] Patent Number: 5,570,507
[45] Date of Patent: Nov. 5, 1996

[54] DEFLAGRATION METHOD FOR MAKING A CAMSHAFT

[76] Inventor: Peter A. Hochstein, 2966 River Valley Dr., Troy, Mich. 48098

[21] Appl. No.: 371,852

[22] Filed: Jan. 12, 1995

Related U.S. Application Data

[62] Division of Ser. No. 198,351, Feb. 18, 1994, Pat. No. 5,406,686.

[51] Int. Cl.⁶ ........................................ B21D 39/00
[52] U.S. Cl. .................... 29/888.1; 29/523; 29/283.5; 29/252; 29/254; 74/567
[58] Field of Search .................... 29/888.1, 523, 29/254, 255, 283.5, 252; 74/567; 72/56; 254/93 R, 93 H; 60/632, 633

[56] References Cited

U.S. PATENT DOCUMENTS

| | | | |
|---|---|---|---|
| 4,494,392 | 1/1985 | Schroeder | 72/56 |
| 4,685,205 | 8/1987 | Schroeder et al. | 72/56 |
| 4,750,250 | 6/1988 | Maus et al. | 29/888.1 |
| 5,085,099 | 2/1992 | Hughes | 29/888.1 |
| 5,220,727 | 6/1993 | Hochstein | 29/888.1 |
| 5,280,672 | 1/1994 | Hochstein | |

FOREIGN PATENT DOCUMENTS

| | | | |
|---|---|---|---|
| 59-113944 | 6/1984 | Japan | 29/888.1 |

*Primary Examiner*—Robert C. Watson
*Attorney, Agent, or Firm*—Howard & Howard

[57] ABSTRACT

A method is disclosed for making a cam shaft from a plurality of cam lobes (14) having apertures (16) disposed therethrough and a hollow tubular shaft (12). The assembly (10) comprises a support arrangement (18) for supporting the cam lobes (14) along the hollow shaft (12); a solid or liquid propellant (20) disposed within the shaft; and a deflagrator (22) for deflagrating the propellant to introduce a sudden increase of gas pressure in the hollow tubular shaft (12) to expand the shaft radially and into engagement with the cam lobes (16) thereby securing the cam lobes to the shaft and preventing movement therebetween. The propellant (20) is disposed axially along the length of the shaft (12) to promote even radial expansion of the shaft. The propellant (20) is distributed evenly along the length of a thick plastic tube (24) which is inserted in the shaft (12).

1 Claim, 2 Drawing Sheets

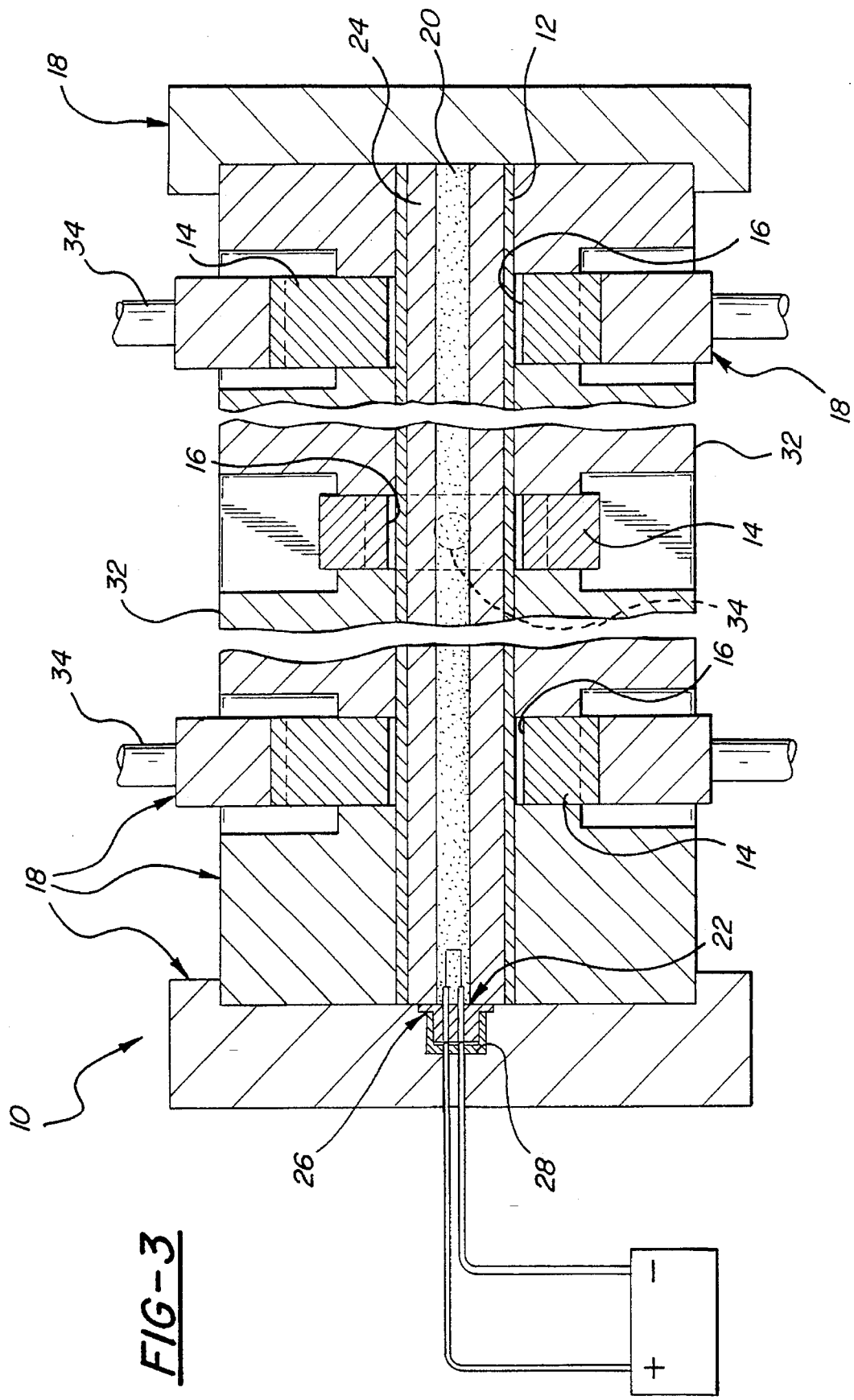

DEFLAGRATION METHOD FOR MAKING A CAMSHAFT

This is a divisional of application Ser. No. 08/198,351 filed on Feb. 18, 1994 now U.S. Pat. No. 5,406,686.

TECHNICAL FIELD

The subject invention relates to a method and apparatus for making camshafts wherein cam lobes are disposed about and secured to a hollow tubular shaft.

BACKGROUND OF THE INVENTION

Cam shaft manufacturers have been making cam shafts by one of various techniques generally involving the steps of placing a number of cam lobes in predetermined positions along a cam shaft, expanding the cam shaft radially outwardly to engage the lobes and thereby locking the lobes in the predetermined positions along the shaft. One technique recently discovered and taught in U.S. Pat. No. 5,220,727 to Hochstein involves placing a propellant in the cam shaft and deflagrating the propellant in order to expand the cam shaft radially into engagement with the cam lobes. The subject invention is essentially an improvement on this promising technique.

SUMMARY OF THE INVENTION AND ADVANTAGES

An assembly is disclosed for making a cam shaft from a plurality of cam lobes having apertures disposed therethrough and a hollow tubular shaft extending between opposite ends and along a longitudinal axis. The assembly comprises: support means for supporting the hollow shaft and the cam lobes; a propellant disposed within the shaft, the propellant including at least one of a solid and liquid; and deflagration means for deflagrating the propellant to introduce a sudden increase of gas pressure within the hollow tubular shaft to expand the shaft radially and into engagement with the cam lobes thereby securing the cam lobes to the shaft and preventing movement therebetween. The assembly is characterized by the propellant being disposed axially along the length of the shaft from one end of the shaft to the other.

A corresponding method is also disclosed for making a cam shaft from a hollow tubular shaft extending between opposite ends and along a longitudinal axis, and a plurality of cam lobes having apertures disposed therethrough. The method comprises the steps of: inserting the hollow tubular shaft through the apertures of the plurality of lobes; positioning the lobes along the hollow tubular shaft; providing one of a solid and a liquid propellant; and deflagrating the propellant to generate a sudden increase of gas pressure into the hollow tubular shaft to expand the shaft into engagement with the lobes thereby securing the lobes to the shaft and preventing movement therebetween. The method is characterized by distributing the propellant within the tubular shaft axially along the length of the shaft from one end of the shaft to the other.

By distributing the propellant evenly along the length of the shaft one can get more even, i.e uniform expansion of the shaft all along its length.

FIGURES IN THE DRAWINGS

Other advantages of the present invention will be readily appreciated as the same becomes better understood by reference to the following detailed description when considered in connection with the accompanying drawings wherein:

FIG. 3 is a sectional view similar to FIG. 2 depicting an electrical initiator in the place of the percussion initiator.

DESCRIPTION OF THE PREFERRED EMBODIMENT

Figure 1:
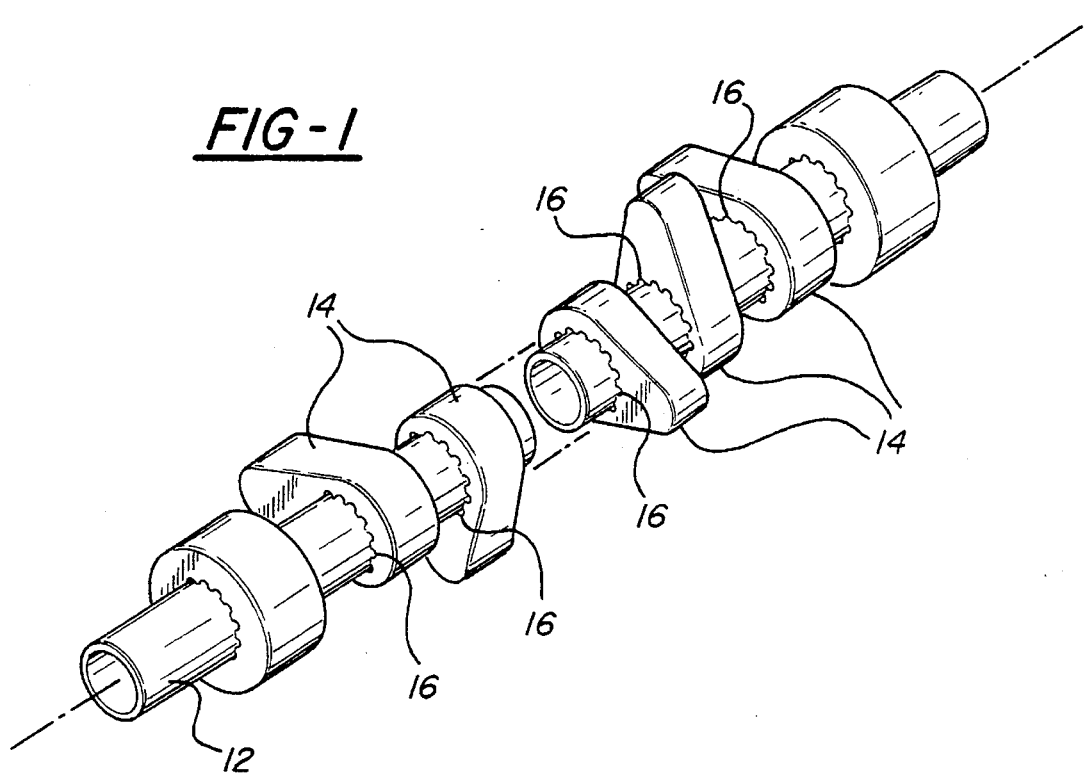
FIG. 1 is a perspective view of a completed cam shaft.
Figure 2:
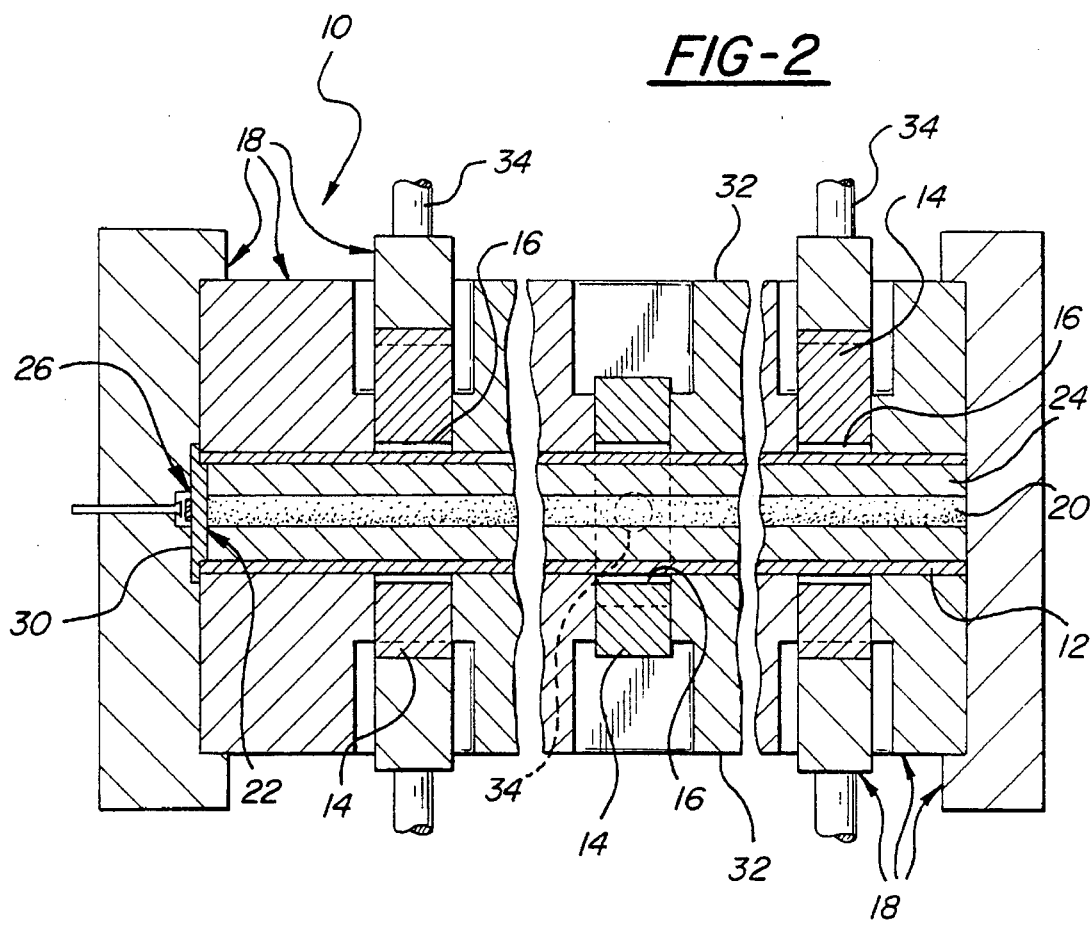
FIG. 2 is a sectional view of a cam shaft die depicting the lobes positioned along the shaft, the elongated tube filled with a propellant and a percussion initiator.

Referring to the Figures wherein like numerals indicate like or corresponding parts throughout the several views, an assembly for making a cam shaft is generally shown at 10.

The assembly 10 is for making a cam shaft from a plurality of cam lobes 14 having apertures 16 disposed therethrough and a hollow tubular shaft 12 extending between opposite ends and along a longitudinal axis. The assembly 10 comprises support means generally indicated at 18 for supporting the hollow shaft 12 and the cam lobes 14; a propellant 20 disposed within the shaft 12, the propellant 20 including at least one of a solid and a liquid; and deflagration means generally indicated at 22 for deflagrating the propellant 20 to introduce a sudden increase of gas pressure within the hollow tubular shaft 12 to expand the shaft radially and into engagement with the cam lobes 14 thereby securing the cam lobes 14 to the shaft 12 and preventing movement therebetween. The assembly 10 is characterized by the propellant 20 being disposed axially along the length of the shaft 12 from one end of the shaft to the other.

The assembly 10 includes radial piston means 24 disposed between the propellant 20 and the shaft 12 for moving radially outward in response to deflagration of the propellant 20 to expand the shaft 12 into engagement with the cam lobes 14. The radial piston means 24 includes an elongated tube disposed within the shaft 12 and extending from one end of the shaft 12 to the other. By the phrase "from one end of the shaft to the other" it is meant that the tube 24 extends generally from one end of the shaft 12 to the other; or from a point adjacent one end to a point adjacent the other end. The desired effect is even expansion of the cam shaft 12 along most, if not all, of its length—particularly in the portions of the length contacting the cam lobes 14 so that the lobes 14 become firmly locked in place along the shaft 12. At the very least, the elongated tube 24 should extend through the cam shaft 12 beyond each of the outside cam lobes 14.

The propellant 20 is evenly distributed within the tube 24 along the length of the tube from one end of the tube 24 to the other. This means that there is roughly the same amount of propellant 20 at each hypothetical point along the length of the tube 24. This is also to ensure an even outward force effecting an even, i.e. uniform outward expansion of the cam shaft 12.

The tube 24 includes an inner diameter defining the volume of space within the tube 24. The propellant 20, together with other items, occupies the entire volume of space defined by the inner diameter. In other words, it is possible that the propellant 20 itself does not occupy the entire space within the tube 24; one could mix other space filling material in with the propellant 20 and achieve a similar effect so long as the propellant 20 itself is still evenly distributed along the length of the tube 24. The shaft 12 defines an inner volume of space which is typically cylindrical. The tube 24 and the propellant 20 occupy the entire volume of space within the shaft 12. In any case, the entire space within the elongated tube 24 should be occupied.

The elongated tube 24 has relatively thick walls: in other words its outer diameter is large relative to its inner diameter. This means that the material comprising the tube 24 occupies most of the space within the shaft 12. It is desirable to reduce the volume of the free space inside the cam shaft 12 in order to maximize the amount of pressure generated by a given amount of the deflagrating propellant 20. Various techniques for reducing space are known, including the use of pellets, etc. as taught in U.S. Pat. No. 5,220,727 to Hochstein. The tube 24 used in the present case is typically a plastic such as polyethylene.

The deflagration process is preferably an oxidizing reaction wherein the propellant 20 is oxidized by an oxidizing agent. The preferred oxidizing agent is oxygen, and specifically oxygen molecularly bonded to the propellant 20. However, the propellant 20 need not be oxidized, or if oxidized, need not utilize oxygen as the oxidizing agent. For example, finely divided, chemically cleaned titanium may be deflagrated if a spark is generated in contact therewith within a nitrogen environment. Note in this example that titanium is not oxidized and oxygen is not present.

The propellant 20 can be a solid or a liquid. It has been observed that gaseous propellants do not produce enough force when deflagrated to expand cam shafts. Examples of suitable propellants include but are not limited to: colloidal nitrocellulose (cellulose nitrate with 12.6% nitrogen), double base powders (60– 80% nitrocellulose, 20–40% nitroglycerin) cordite, flashless non-hydroscopic powders, Albanite (Di(2-nitrooxyethyl)nitramine), and black powder.

The deflagrating means 22 also includes initiation means generally indicated at 26 for initiating the propellant 20 to deflagrate. The initiation means 26 can include a number of different initiators. For example, the initiator can include a commercial electrical initiator 28. Such initiators 28 are well known in the deflagration arts. Generally, they include some type of electrical source, two leads and a bridge wire or filament extending between the leads. When a current runs across the leads through the bridge wire the bridge wire becomes very hot to initiate the propellant 20. The initiator can also include a percussion initiator 30. These are also well known in the deflagration art. In one specific embodiment, the initiator includes large rifle primer.

The support means 18 includes a die 32 and a number of locator arms 34 for contacting the lobes 14 and maintaining the lobes 14 in a predetermined disposition, i.e. at an angle, with respect to the cam shaft 12. This support means 18 is taught in detail in U.S. Pat. No. 5,220,727 to Hochstein, the teachings of which are incorporated herein by reference.

It has been said that the propellant 20 should be evenly distributed evenly within and along the length of the plastic tube 24; however, it is conceivable to distribute the propellant 20 unevenly within the tube 24, or somewhere other than inside the tube 24. In such a case, it is still desirable to insert the elongated tube 24 within the cam shaft 12 before deflagrating the propellant 20. The elongated tube 24 will act as a radial piston when the propellant 20 is deflagrated, expanding outwardly to expand the cam shaft 12. Also, the elongated tube 24 will reduce empty space in the cam shaft 12 to achieve the benefits discussed above.

A corresponding method is also disclosed for making a cam shaft 12 from a hollow tubular shaft extending between opposite ends and along a longitudinal axis, and a plurality of cam lobes 14 having apertures 16 disposed therethrough. The method comprises the steps of: inserting the hollow tubular shaft 12 through the apertures 16 of the plurality of lobes 14; positioning the lobes 14 along the hollow tubular shaft 12; providing one of a solid and a liquid propellant 20; and deflagrating the propellant 20 to generate a sudden increase of gas pressure into the hollow tubular shaft 12 to expand the shaft into engagement with the lobes 14 thereby securing the lobes 14 to the shaft 12 and preventing movement therebetween. The method is characterized by distributing the propellant 20 within the tubular shaft 12 axially along the length of the shaft 12 from one end of the shaft to the other.

By the phrase "from one end of the shaft to the other" it is meant that the propellant 20 extends generally from one end of the shaft 12 to the other; or from a point adjacent one end to a point adjacent the other end. The desired effect is even, i.e. uniform expansion of the cam shaft 12 along most, if not all, of its length—particularly in the portions of the length contacting the cam lobes 14 so that the lobes 14 become firmly locked in place along the shaft 12. At the very least, the elongated tube 24 should extend through the cam shaft 12 beyond each of the outside cam lobes 14.

The propellant 20 is evenly distributed within the tube 24 along the length of the tube from one end of the tube 24 to the other. This means that there is roughly the same amount of propellant 20 at each hypothetical point along the length of the tube 24. This is also to ensure an even or uniform outward force effecting an even or uniform outward expansion of the cam shaft 12.

The inventive method is further characterized by reducing the volume of empty space in the hollow tubular shaft 12 prior to deflagrating the propellant 20. It has been said that this can be achieved in a number of ways, but that the preferred way is to insert the elongated tube 24 into the cam shaft 12. The tube 24 has an outer diameter slightly less than the inner diameter of the cam shaft 12 and an inner diameter which is small relative to the outer diameter so that the walls of the tube 24 are thick.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A method for making a cam shaft from a hollow tubular shaft (12) extending between opposite ends and along a longitudinal axis, and a plurality of cam lobes (14) having apertures (16) disposed therethrough, the method comprising the steps of:

inserting the hollow tubular shaft (12) through the apertures (16) of the plurality of lobes (14);

positioning the lobes (14) along the hollow tubular shaft (12);

providing one of a solid and a liquid propellant (20);

inserting an elongated tube (24) having an inner diameter defining a volume of space into the tubular shaft (12) along the entire length of the shaft (12);

disposing propellant (22) in the volume of space along the elongated tube (24);

limiting the radial expansion of the shaft (12) with support means (18) axially between the lobes (14), and deflagrating the propellant (20) to generate a sudden increase of gas pressure into the hollow tubular shaft (12) to expand the shaft into engagement with the lobes (14) thereby securing the lobes (14) to the shaft (12) and preventing movement therebetween.

\* \* \* \* \*